(No Model.) 5 Sheets—Sheet 1.

C. T. MASON, Jr.
COTTON HARVESTING MACHINE.

No. 337,007. Patented Mar. 2, 1886.

Fig. 1.

WITNESSES:
Gustave Dieterich
A. J. Stewart

INVENTOR
Chas. T. Mason Jr.
BY
Park Benjamin & Co
his ATTORNEYS (No Model.)  5 Sheets—Sheet 3.

C. T. MASON, Jr.
COTTON HARVESTING MACHINE.

No. 337,007.  Patented Mar. 2, 1886.

WITNESSES:  INVENTOR
Chas. T. Mason Jr.
BY
Park Benjamin & Son
his ATTORNEYS.

(No Model.) 5 Sheets—Sheet 4.
C. T. MASON, Jr.
COTTON HARVESTING MACHINE.
No. 337,007. Patented Mar. 2, 1886.

(No Model.) 5 Sheets—Sheet 5.

C. T. MASON, Jr.

COTTON HARVESTING MACHINE.

No. 337,007. Patented Mar. 2, 1886.

UNITED STATES PATENT OFFICE.

CHARLES T. MASON, JR., OF SUMTER, SOUTH CAROLINA.

COTTON-HARVESTING MACHINE.

SPECIFICATION forming part of Letters Patent No. 337,007, dated March 2, 1886.

Application filed December 11, 1883. Serial No. 114,167. (No model.) Patented in Turkey December 27, 1884, No. 42; in Cape Colony January 13, 1885, No. 11/104; in Natal January 16, 1885, No. 3, and in India February 28, 1885, No. 210.

*To all whom it may concern:*

Be it known that I, CHARLES T. MASON, Jr., of Sumter, Sumter county, South Carolina, have invented a new and useful Improvement in Cotton-Harvesting Machines, of which the following is a specification.

The invention consists, generally, in a machine for gathering cotton from the plants, and more particularly in the novel construction and mode of operation of the picking mechanism, and in the devices for actuating the same, and for transferring the gathered cotton to a suitable receptacle.

In the accompanying drawings.

The machine in operation passes over the row of plants from which the cotton is to be gathered. The wheels therefore travel in the spaces on each side of the row, and the horse is hitched in front of and to one side of the machine, so that he may walk in one of said spaces.

The machine contains two symmetrically-disposed compartments, 1 and 2, united by transverse pieces at a point sufficiently high to enable the cotton-plants to pass between them. The picking mechanism operates in the space between these compartments and delivers the gathered cotton into both of them. In each compartment a wheel is journaled, and the picking devices are actuated by mechanism transmitting motion from one of the wheels. The cotton accumulated in the compartments is by suitable conveying and elevating devices carried into receptacles attached to the rear of the machine.

Figure 1:
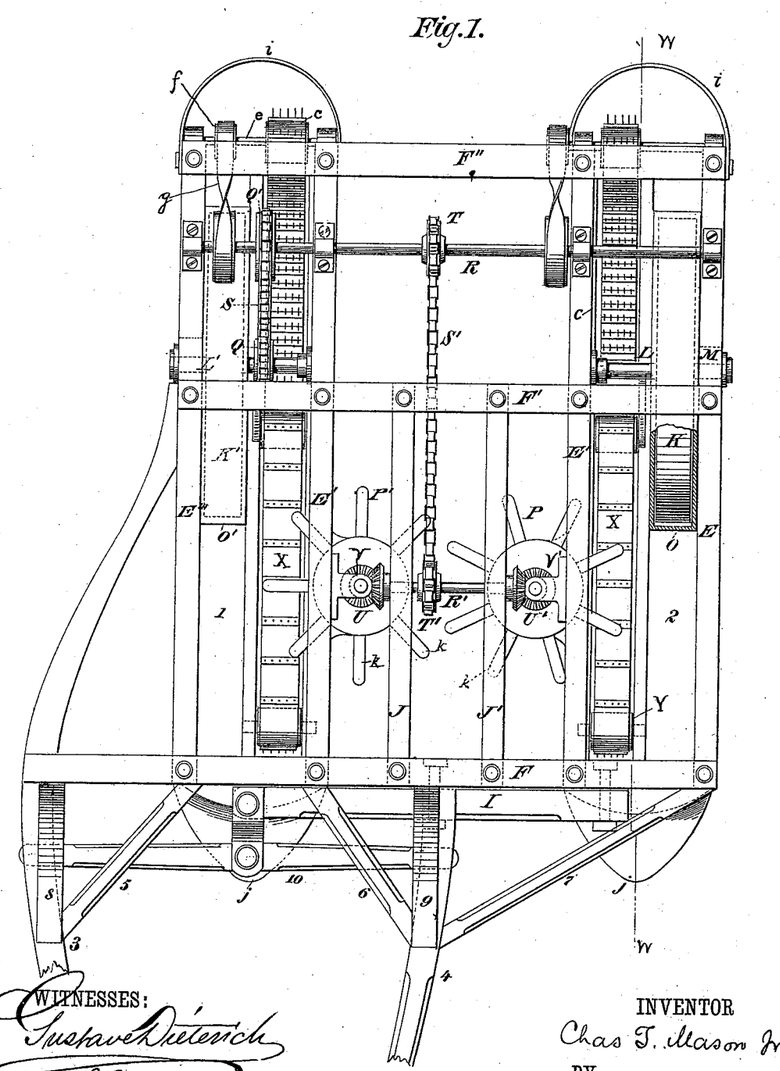
Figure 1 is a top view of the machine.
Figure 2:
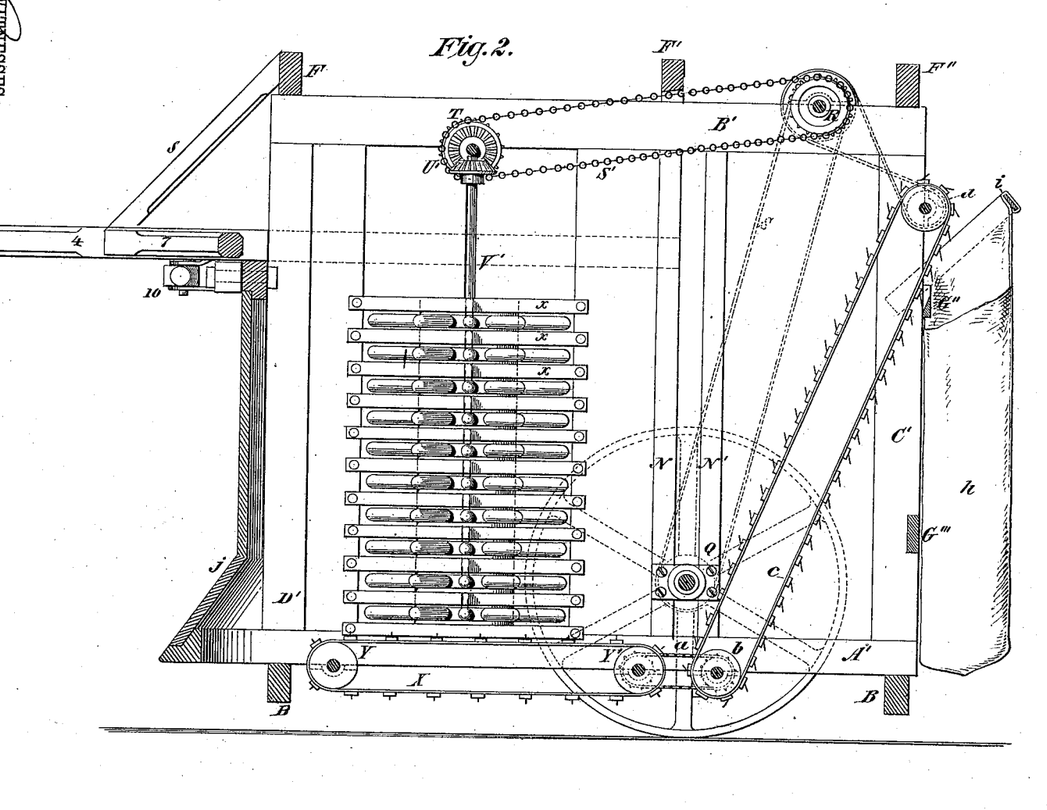
Fig. 2 is a longitudinal section on the line $w\ w$, Fig. 1.
Figure 3:
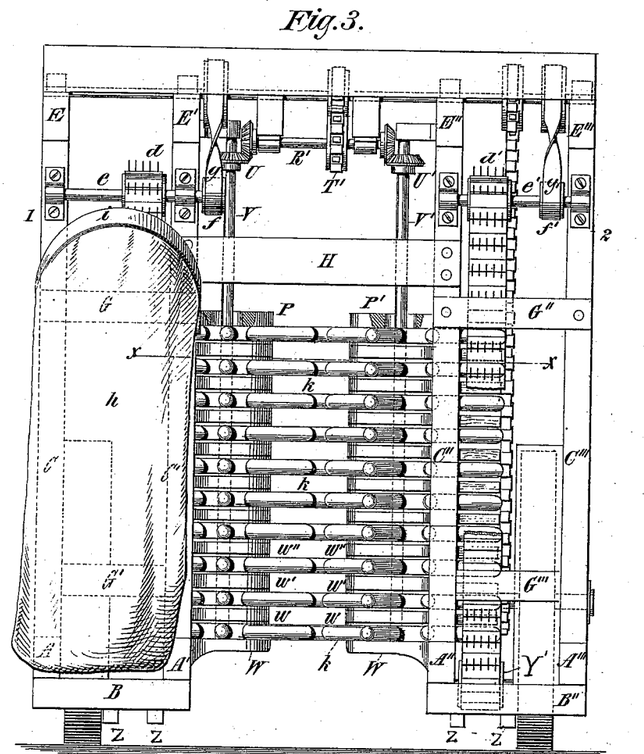
Fig. 3 is a rear view.

The framing of the machine is as follows: A A' A" A''' are longitudinal bottom pieces. Beneath these are transverse bottom pieces B B' B" B''', (B''' not being shown.) From the rear ends of the longitudinal pieces A A' A" A''' rise four posts, C C' C" C''', Fig. 3. From the front ends of said longitudinal pieces rise four corresponding posts, D D' D" D''', one of which, D', is shown in Fig. 2, the others not being shown. Above the posts C C' C" C''' are longitudinal top pieces E E' E" E''', corresponding to the bottom pieces A A' A" A'''. Finally, above the top pieces E E' E" E''' are three transverse top pieces, F F' F", Fig. 1. At the rear of the machine, Fig. 3, are two transverse pieces, G G', extending between the posts C C', and two corresponding posts, G" G''', extending between the posts C" C'''. There is also a transverse piece, H, extending between the posts C' C". At the front of the machine there is a transverse piece, I, extending between the posts D' D". At the top of the machine, Fig. 1, are short longitudinal pieces J J', extending between the transverse pieces F F'. K and K' are the wheels. Each wheel has a short axle, L or L'. The outer end of the axle L is journaled in an upright post, M, extending between the longitudinal pieces A and E. The inner end of said axle is supported in a bearing arranged upon two parallel posts, N N', Fig. 2, extending between the longitudinal pieces A' E'. The axle L' of the wheel K' is supported in similar manner on the other side of the machine. Each wheel is inclosed in a casing, O.

The foregoing completes the description of the framing of the machine and the wheels on which it is supported. When the machine is moved forward, the rotation of the wheels sets the picking mechanism in motion. I will next explain how this is accomplished. The picking mechanism consists of a series of stems, each rotating on its own axis, and each projecting horizontally from a supporting-ring secured upon a vertical shaft. The rings which support the stems, together with other devices hereinafter to be explained, are arranged vertically above one another in two groups, which groups, for convenience of description, I shall hereinafter call the "picking-cylinders." One picking-cylinder is shown at P, the other at P'. These cylinders are rotated on their vertical axes by the movement of the machine in the following manner: On the axle L' of the wheel K' is a sprocket-wheel, Q, Fig. 1. On a shaft, R, extending across the top of the machine, and having bearings on the top longitudinal pieces E E' E'' E''', is another sprocket-wheel, Q'. Between the sprocket-wheels Q and Q' extends the chain belt S. Consequently the rotation of the wheel K' and axle L', through the medium of the belt S, rotates the shaft R. On the shaft R, and near its middle, Fig. 1, is another sprocket-wheel, T. On a short shaft, R,' which is suspended in hangers, Fig. 3, from the short longitudinal top pieces J and J', is also a sprocket-wheel, T'. Between these wheels T and T' extends a chain, S'. The rotation of the shaft R is therefore by the chain S' transmitted to the shaft R'. On the ends of the shaft R' are bevel-pinions, which engage with similar pinions, U U', fixed to the vertical shafts V V', upon which shafts are secured the picking-cylinders P P'. The shafts V V' are supported at their lower ends in steps W. The shafts V V', and consequently the picker-cylinders P P', are therefore rotated by the wheel K', through the medium of the sprocket-wheels Q Q', chain S, shaft R, sprocket-wheels T and T', chain S', shaft R', and bevel-gearing U U'. The driving-gearing of the picker-cylinders is preferably so constructed and arranged that the speed of rotation of said cylinders shall equal the speed of forward motion of the machine. Inasmuch, therefore, as the picker-cylinders revolve from front to rear at their adjacent sides while the machine is moving bodily forward, it follows that the radial stems on said cylinders will, with reference to the cotton-plants into which they enter, be for a certain period stationary. The advantage of this is, as will be more particularly explained hereinafter, that time is afforded for the picker-stems to rotate on their axes in the plant, and so gather all the adjacent cotton from the bolls. After the cotton has been gathered, the stems are caused to surrender it. The mechanism for this purpose will also be fully described further on.

Figure 4:
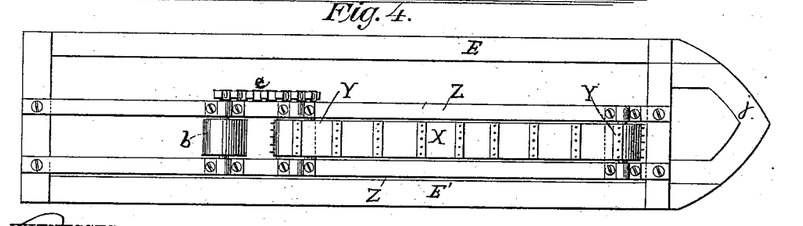
Fig. 4 is a bottom view of one compartment-frame and its conveyer-belt.

Referring more particularly to Fig. 2, directly beneath the picker-cylinder is shown an endless conveyer-apron, X, passing over rollers Y Y', having bearings in two parallel bottom bars, Z Z, Fig. 4. This apron is provided with projecting points to catch and hold the cotton that falls from the picker-cylinder above. On the shaft of the roller Y' is a sprocket-wheel, which, by a belt or chain, a, drives another sprocket-wheel secured on the shaft of a roller, b. Over the roller b passes another apron, c, also covered with points or projections. This apron passes over a roller, d, on a short shaft, e, supported in journals upon and in rear of the posts C C'. Beneath the other picker-cylinder, on the opposite side of the machine, is a horizontal endless apron and an inclined endless apron, arranged as above described, the upper end of the inclined apron passing over a roller, d', on a short shaft, e', arranged between and in rear of the posts C'' C'''. On the shafts e e' are pulleys f f', which by belts g g' are driven by the shaft R. This shaft, as already explained, receives motion from the wheels by the chain belt S. It will be apparent, therefore, that from the shaft R motion is transmitted, as already described, to the picker-cylinders, and simultaneously to the shafts e e', apron c, belt or chain a, and apron X. The aprons X and c are conveyers. The cotton falling upon the conveyer X is taken therefrom by the elevating-conveyer c, and is thereby lifted above the level of the mouth of the bag h, which is supported on a curved bar, i, secured to the rear of the machine. Into this bag the cotton falls from the elevating-conveyer c. A bag may be placed in rear of each side of the machine, and thus two receptacles may be filled simultaneously, and when filled may be removed and empty bags substituted. The compartments 1 and 2 are boarded or covered on their lateral sides. The front end of each is rounded, and at its lower portion is provided with a projection, j, analogous to the pilot of a locomotive. The object of the projections j j is to separate the plants in the row passing through the machine from the plants in the adjacent rows.

Figures 7, 8, 9:
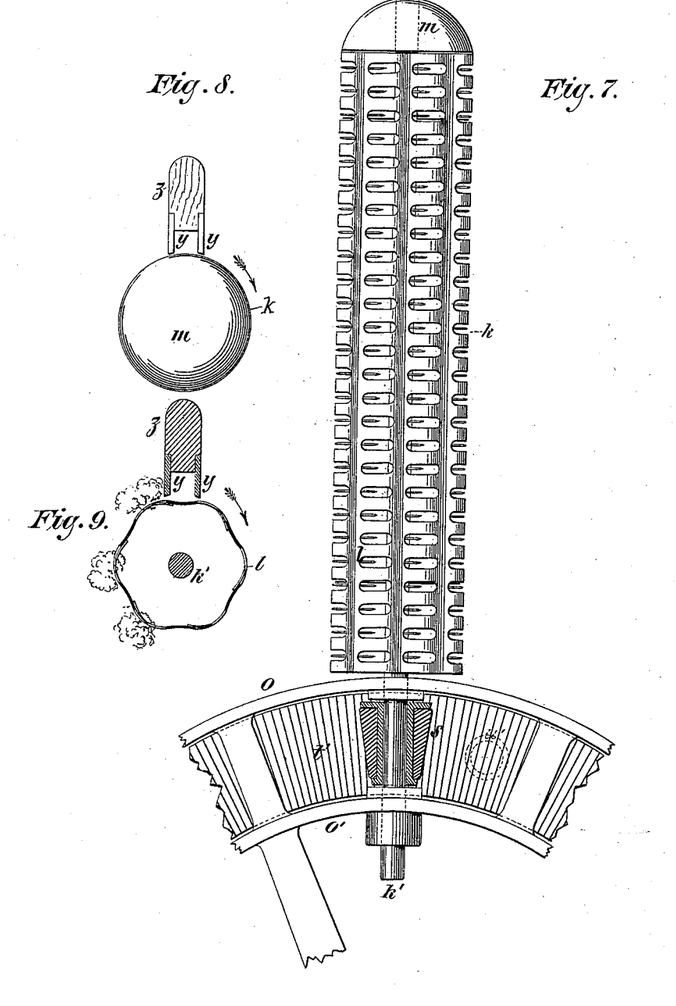
Fig. 7 is an enlarged detail view of one of the pickers, showing mode of support of same.
Fig. 8 is an end view of one of the cotton-picker stems and of the bar or doffer for removing the cotton therefrom.
Fig. 9 is an enlarged detail section of stem and doffer on line $z\ z$, Fig. 5.

Referring now more particularly to Figs. 5, 6, 7, and 8, the construction and arrangement of the picking devices are as follows:

Fig. 7 shows one of the picker-stems k. This may consist of a central rod, k', supporting a metal envelope, l, longitudinally corrugated, and having a series of recesses in which are formed teeth, the points of said teeth being disposed below the level of the adjacent guards formed by the envelope l. The envelope l is supported on the central rod, k', in any convenient manner. At the end of said rod is provided a rounded piece, m, Figs. 7 and 8. The construction of this picker-stem is not herein claimed, inasmuch as it is the subject of Letters Patent No. 293,484, dated February 12, 1884, and No. 331,514, dated December 1, 1885. To these patents reference is made for details.

Figure 5:
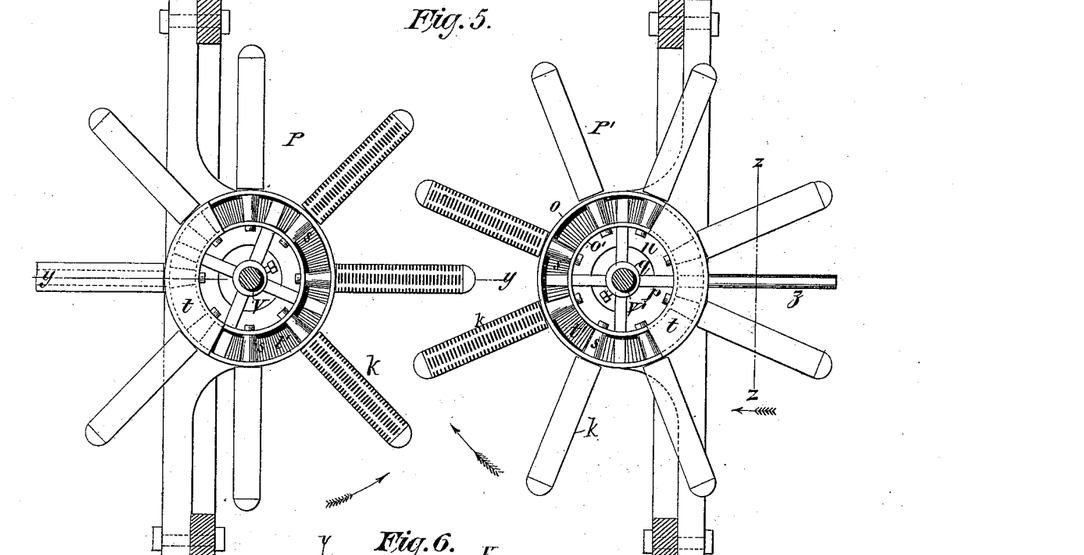
Fig. 5 is an enlarged detail section on the line $x\ x$, Fig. 3.
Figure 6:
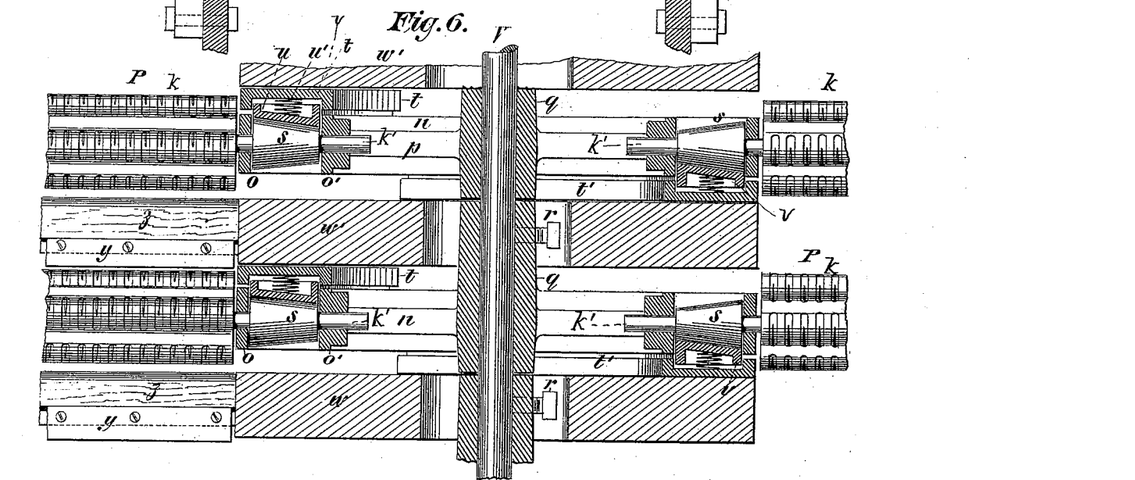
Fig. 6 is an enlarged detail section on the line $y\ y$, Fig. 5.

In Figs. 5 and 6, n is a ring, of cast metal, having two concentric rims or flanges, o o', and radial arms p, attaching its center sleeve, q, to said flanges. The sleeve q surrounds the rod and is fastened thereon by a set-screw, r. The inner end of the picker-stem rod k' passes through and has bearings in the rims or flanges o o'. In this way each picker-stem k is supported in the plane of the ring n and projecting radially from its circumference. On the portion of the picker-stem rod k' included between the rims o o' is secured a conical roller, s, which may be covered with leather or rubber to increase the friction. The roller s fits tightly upon the rod k', and so prevents the latter from moving out of its bearings in the flanges. t and t' are parts of a loose mutilated metal ring, the portion t being placed above the ring and the portion t' being placed below said ring. On the under side of the part t is formed a circumferential groove or channel, in which is placed a circular piece of metal, $u$, having an inclined surface, which may be corrugated or roughened. Spiral or other springs, $u'$, are inserted between the piece $u$ and the piece $t$. In the under portion, $t'$, there is formed a similar groove or channel on its upper side, and in this groove is placed a curved piece, $v$, similar to the curved piece $u$, and also springs similar to the springs $u'$. $w$ $w'$ $w''$, &c., are disks, which may be of wood, having large circular openings through which loosely pass the upwardly-projecting portions of the sleeves $q$. These disks are rigidly secured to the inner casing of each compartment, by means of bars $x$ $x$. (Shown best in Fig. 2.)

Referring now to Fig. 6, it will be seen that the lower disk, $w$, being rigidly supported by the bar $x$, receives upon its upper side the portion $t'$ of the mutilated ring. The stem-supporting ring $n$ is then next in order above, and this ring is secured to the rod by its sleeve. The roller $s$ in said ring $n$ then rests upon the curved piece $v$ in the groove of the part $t'$. Above the ring $n$, and resting thereupon, is placed the part $t$ of the mutilated ring. The circular piece $u$ then bears upon the roller $s$ immediately beneath it. Finally, above the part $t$ is another disk, $w'$, and the various portions provided upward in the same order again. The function and operation of this mechanism are as follows: When the central shaft of the picking-cylinder is rotated in the manner already described, the rings $n$ all rotate with it, being rigidly fastened upon it. The disks $w$, however, remain stationary, being so held by their fastening-bars $x$. The rings $n$, therefore, rotate between the fixed disks $w$. It will be apparent that when the ring $n$ rotates, the roller $s$ will be turned on its axis by reason of its contact with the plate $v$ beneath it. So long as the roller is in contact with that plate, its rotation will be in one direction; but the plate $v$ does not extend entirely around and under the ring $n$. The mutilated ring has one part, $t'$, below the ring $n$, and another part, $t$, above said ring. Consequently after the roller $s$ has traveled a certain distance it runs off the plate $v$ beneath it; but the ends of the part $t$ of the mutilated ring are immediately above the ends of the part $t'$; hence as the roller $s$ leaves the plate $v$ its upper surface constantly comes in contact with the bearing-plate $u$. The effect of this is to reverse the direction of rotation of the roller, so that over one portion of its circular travel, the roller, and consequently the picker-stem turns on its axis in one direction, while during another portion of its travel it turns in the opposite direction. The object of this will be clear from Fig. 5. The picker-cylinders turn in the direction of the arrows—that is, from front to rear of the machine. It will be noticed that the central shaft of each picking-cylinder is situated just outside the compartments 1 and 2, so that the picking-stems move into and out of the compartments during their revolution. The change of axial rotation of the stems occurs just as the latter enter and leave the compartments—or in other words, while outside of the compartments 1 and 2 the stems rotate in one direction, and when inside the said compartments they rotate in the opposite direction. While they are outside of the compartments, or rather between them the stems gather the cotton. The cotton, by its own elasticity, presses slightly into the recesses on the stem sufficiently to be grasped by the teeth and becomes wound about the stem. When the latter enters the compartment, it is at once turned in the opposite direction. While so turning the periphery of the stems meets the doffing blade or blades $y$, which are secured to the lower edges of bars $z$, Figs. 5 and 8, which bars $z$ are secured and stand at right angles to bars $x$. The cotton, as represented in Fig. 9, is thus removed from the teeth of the stems and falls upon the conveyor-belt X beneath. The bars $x$ form a grid or grating which extends across the opening in the sides of the cotton-receiving compartments, the operation of removal being as hereinafter set forth.

On referring to Figs. 5 and 7, it will be seen that the doffer $y$ projects into the box at a point opposite the middle of plate $v$, by means of which plate a reverse motion, as described, is imparted to the stem from that which is given to it while gathering the cotton. It follows, therefore, that the stem is rotated in a reverse direction before it reaches the doffer $y$. The immediate effect of the reversal of rotation of the stem is to throw off the cotton from the picking-teeth, by reason of the inertia of said cotton, or of the centrifugal force of rotation of the stem, the cotton being thereby caused to slide outwardly on and from the teeth.

The object of placing the doffer midway with reference to the plate $v$ is to meet and provide for the removal of the cotton, even under the accidental conditions hereinafter set forth—that is to say, when the cotton, for example, is unduly moist or from other causes has become packed or matted together, it may, when the stem is reversed in motion, form a loose ring around the stem in which the stem will freely turn, so that the cotton, while actually disengaged from the teeth, still remains hanging on the stem. A mere touch of the doffer as the stem is carried past it is sufficient to break such a ring, and then the subsequent rotation of the stem after passing the doffer immediately throws the ring off. It should be particularly noticed that the stem does not make a complete revolution while in contact with the doffer, as will be evident by simple inspection of the relations of the roller on the end of the stem and the gear-plate, as shown in Fig. 7. Where a doffer alone is depended upon to clear a stem or any other rotating cylinder, it is of course necessary that the doffer-edge should wipe around the entire periphery; but where, as in the present case, the object is merely to cause a breakage of a possible ring of cotton loosely encircling the cylinder, then it is plainly needless for the doffer to do more than make contact with the stem for a very brief period, as the stem is bodily carried through the cotton-receiving compartment, in order to insure breakage of the ring.

I have at various times arranged the doffers at different angles in the box, so that they might meet the stems at different periods during the reverse revolution of said stems after a sufficient duration of said revolution has been allowed to cause the cotton to be thrown off by its inertia under all usual conditions; but I find that the arrangement of the doffers in the position shown is preferable, not only for the reasons above given, but because the series of doffers form a partition or grid transversely the cotton-receiving box, and so confine the cotton, or the very much greater portion of it, in that part of the box nearest the elevating-aprons, and thus prevent the cotton from being thrown into the front part of the compartment. It will be apparent, therefore, that the presence of a doffer is not necessary nor essential to the gathering and release of the cotton in my machine, because I may omit it altogether and rely safely on the disengagement of the cotton from the teeth of the stem by the inertia of said cotton when the motion of the stem is reversed; but to meet accidental conditions the presence of the doffers is desirable, and therefore I prefer to use them.

I have practically tested in the cotton-field a machine constructed substantially as here shown and described, without doffers, and find that it operates to gather the cotton and to release the same by the action of the inertia of said cotton, as above set forth.

The number of rings $n$ and disks $w$, and consequently the number of stems on the picking-cylinders, may be varied at will to suit the height of the plants. The stems are preferably arranged as shown in Fig. 5—that is, those on one picking-cylinder alternating with those on the other cylinder.

The device for applying draft to the machine is shown in Figs. 1 and 2. The animal is attached in the shafts 3 and 4, the shaft 3 extending rearwardly and being secured to the side of the machine. 5, 6, and 7 are braces for the shafts extending laterally, and 8 and 9 are braces extending upwardly. 10 is the whiffletree.

The operation of the entire machine can now easily be followed. As it is drawn forward the pilots or dividers on the compartments 1 and 2 push all the plants of the row to be harvested into the space between said compartments, while moving the plants of the adjacent rows on each side outwardly and clear of the wheels. The picking-cylinders have a revolving motion rearwardly, equal in speed to the forward motion of the machine. The picker-stems are therefore not drawn directly laterally through the plants, but simply enter the latter and are withdrawn again, being stationary, or nearly so, while in the plants. While in this position the picker-stems rotate on their own axes, and so gather the cotton. The construction of the stem is such that it collects only the ripe cotton. It does not gather branches or leaves or unripe bolls. As the machine progresses the filled stems move into the compartments, new empty stems meeting the succeeding plants. As soon as the stems arrive inside the compartments their axial rotation is reversed. This disengages the cotton which falls upon the horizontal conveyers, whence it passes to the elevating-conveyers, and by these last it is delivered into the bags provided in rear of the machine to receive it. The operation of the machine is therefore continuous as long as it is in motion.

I have found in actual practice that the apparatus drawn by one horse is capable of harvesting about four bales of cotton per day, delivering the cotton in excellent condition with very little dead leaves, seeds, and other impurities in it.

I regard the manner of introducing the stems and withdrawing them from the plants as a feature of great advantage, inasmuch as the stems, not being dragged laterally through the plants, do not break the latter, and are not themselves subjected to undue strains and wear. At the same time they are enabled to rotate directly in the bushes, and so perform their function of gathering the cotton.

I claim as my invention—

1. In a cotton-harvesting machine, two or more sets of picker-stems and means for revolving them about a vertical axis, in combination with means for imparting to said stems an independent rotation about their individual axes, first in one direction and then in the other, substantially as described.

2. In a cotton-harvesting machine, a cotton-picker stem projecting radially from a support, a means of rotating said support and thereby giving said stem a circular movement of translation, and a means of simultaneously rotating said stem on its longitudinal axis in alternately-opposite directions, substantially as described.

3. In a cotton-harvesting machine, the combination of a cotton-receiving compartment, a cotton-picker stem projecting radially from a support placed in proximity to said compartment, a means for rotating said support and thereby giving said stem a circular movement of translation into and out of said compartment, and a means for rotating said stem on its individual axis in alternately-opposite directions, whereby said stem is rotated in one direction while in the compartment and in the other direction while out of the same, substantially as described.

4. In a cotton-harvesting machine, the combination of two shafts on opposite sides thereof, means for rotating the same, a space between said shafts for the passage of the cotton-plants, two cotton-receiving compartments on opposite sides of the machine and outside of said shafts, cotton-picker stems radially projecting from and supported on said shafts and having circumferentially-disposed teeth turned with their points in the same direction, means for rotating said stems on their individual axes in one direction with their teeth-points forward to gather the cotton while moving through the plants, and means for rotating them in the opposite direction to release said cotton while moving through said compartments, substantially as described.

5. In a cotton-harvesting machine, a series of cotton-picker stems radially projecting from a support, a second series of cotton-picker stems radially projecting from a second support, the said supports being relatively so disposed that the stems on one support may alternate with or enter the intervals between the stems on the other support, and a means of rotating said supports, substantially as described.

6. In a cotton-harvesting machine, the combination of a shaft, a means of rotating the same, a circular support rigidly secured thereon, a cotton-picker stem having its central rod journaled at one end in said support and projecting radially therefrom, a roller rigidly attached to said central rod near the bearings thereof, and two fixed plates or bearing-surfaces supported one above and the other below said roller and alternately in contact therewith, the said parts being so combined and arranged that the rotation of the shaft shall cause the roller to move along one of said bearing-surfaces and be thereby rotated in one direction, and then along the other of said bearing-surfaces and thereby be rotated in the other direction, thus causing the revolution of the cotton-picker stem on its longitudinal axis in successively-opposite directions, substantially as described.

7. In a cotton-harvesting machine, the combination of a shaft, a means of rotating the same, a series of circular supports rigidly recured to said shaft, each support having journaled in its periphery and radially projecting therefrom one or more cotton-picker stems, and a series of independently-sustained fixed rings not connected to said shaft, but inclosing the same, interposed between said supports, substantially as described.

8. In a cotton-harvesting machine, the combination of the shaft V, a means of rotating the same, the circular support $n$, having rims or flanges $o\ o'$, and rigidly secured to said shaft, a cotton-picker stem, $k$, journaled in said rims and provided with a roller, $s$, independently-sustained ring $w$, and a bearing plate or surface arranged in contact with said roller and between said roller and ring $w$, substantially as described.

9. In a cotton-harvesting machine, the combination of the shaft V, a means of rotating the same, the circular support $n$, having rims or flanges $o\ o'$, and rigidly secured to said shaft, a cotton-picker stem, $k$, journaled in said rims and provided with a roller, $s$, the two independently-sustained rings $w\ w'$, located one above and the other below said roller, and bearing plates or surfaces arranged to come alternately in contact with said roller and between said roller and the rings, substantially as described.

10. In a cotton-harvesting machine, the combination of the shaft V, a means of rotating the same, a circular support, $n$, having rims or flanges $o\ o'$, and rigidly secured to said shaft, a cotton-picker stem, $k$, journaled in said rims and provided with a roller, $s$, and a spring-supported bearing-plate, $v$, or surface, arranged in contact with said roller, and an independently-fixed support not connected to the shaft, substantially as described.

11. The combination of a roller, $s$, on the central rod of the cotton-picker stem, held in bearings in the support $n$, loose bearing-plate $u$ in contact with said roller, spring $n'$, grooved or channeled plate $t$, and an independently-fixed support, $w'$, for said last-mentioned plate, substantially as described.

12. The combination of a conical roller, $s$, on the central rod of the cotton-picker stem, held in bearings in the support, the loose beveled bearing-plate in contact with said roller, the interposed spring, the grooved or channeled plate, and an independent fixed support, $w$, for said last-mentioned plate, substantially as described.

13. In a cotton-harvesting machine, the combination of a rotary shaft, a series of supports rigidly secured thereon, a series of rotary cotton-picker stems journaled in each of said supports and radially projecting therefrom, a series of rings encircling said shaft and interposed between said supports, and a series of bars secured to the frame or body of the machine, and each bar carrying one of said rings, the said bars forming a grating or grid through which the stems pass in entering and leaving the cotton-receiving compartment, substantially as described.

14. In a cotton-harvesting machine, the combination of a rotary shaft, a series of supports rigidly secured thereon, a series of rotary cotton-picker stems journaled in each of said supports and radially projecting therefrom, a series of independently-supported rings encircling said shaft and interposed between said supports, and a series of bars secured to the frame or body of the machine, forming a grating or grid across the opening of the cotton-receiving compartment, through which the stems pass in entering and leaving the same, each bar carrying a doffer or clearing bar for said stems, projecting into the cotton-receiving compartment, substantially as described.

15. In a cotton-harvesting machine, the combination of a rotary shaft, a support rigidly secured thereon, a cotton-picker stem journaled at one end in said support and rotating on its own axis, and a doffing or clearing bar for said stem independently supported, and provided at its edge with a blade or blades, substantially as described.

16. In a cotton-harvesting machine, the combination of an upright rotary shaft, a support rigidly secured thereon, a cotton-picker stem journaled on said support and rotating on its own axis, and a doffer or clearing bar and a cotton-conveying apron beneath the same, the said doffing-bar being independently supported at right angles to said shaft and across the conveying-apron, substantially as described.

17. In a cotton-harvesting machine, the supporting-wheel K', axle L', pulley Q, belt S, pulley Q', shaft R, pulley T, belt S', pulley T', shaft R', bevel-gears U U', and vertical shafts V V', carrying the cotton-gathering devices, substantially as described.

18. In a cotton-harvesting machine, the supporting-wheel K', axle L', pulley Q, belt S, pulley Q', shaft R, belt g, pulley f, shaft e, pulley d, apron c, roller b, roller Y', apron X, roller Y, and a belt, a, for transmitting motion between the shafts of the pulleys b and Y', substantially as described.

19. In a cotton-harvesting machine, the combination of the shaft V, a means of rotating the same, a series of circular supports, n, having rims or flanges o o', and elongated hubs or sleeves q, rigidly secured to said shaft with their ends in contact, a cotton-picker stem or stems, k, journaled in said rims, and each stem provided with a roller, s, independently-sustained rings w w', encircling said hubs between said supports n, and one above and the other below said roller, and bearing plates or surfaces arranged to alternately come in contact with said roller, substantially as described.

20. In a cotton-harvesting machine, the combination, with a rotary shaft, of a series of picker-stems radially mounted thereon, means for rotating said stems on their own axes in one direction to gather the cotton, and means for consecutively rotating them in the opposite direction to discharge the gathered cotton, a discharge of the said cotton being effected from said stems on the reverse movement thereof by its inertia or by the centrifugal force of rotation of said stems, substantially as described.

CHARLES T. MASON, Jr.

Witnesses:
C. M. HURST,
F. H. HUDSON.